Figure 3:
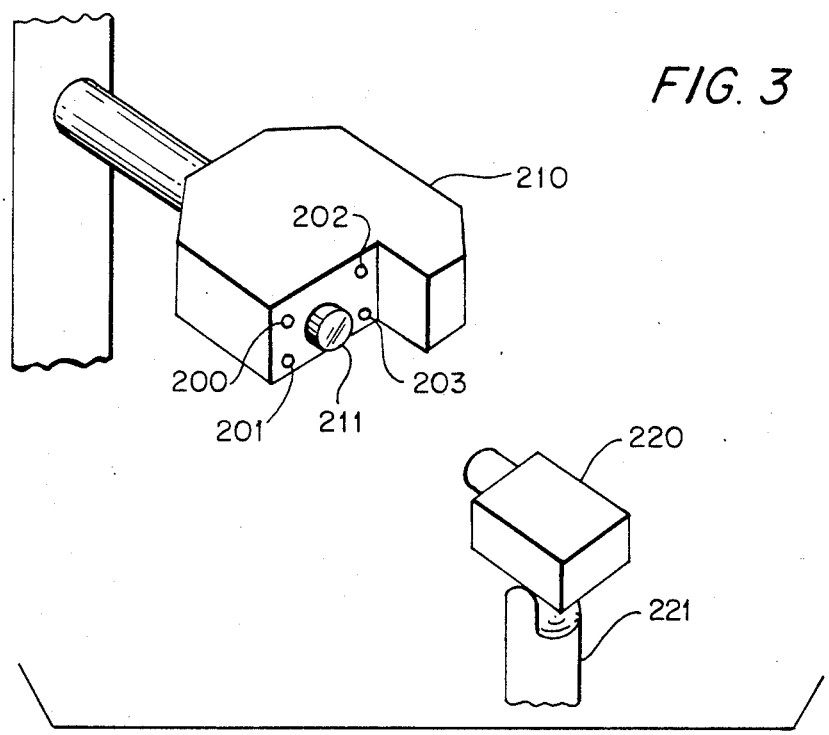

United States Patent [19]

George et al.

[11] Patent Number: 4,754,415

[45] Date of Patent: Jun. 28, 1988

[54] ROBOTIC ALIGNMENT AND PART SIMULATION

[75] Inventors: Satish George, Windsor; Timothy R. Pryor, Tecumseh, both of Canada

[73] Assignee: Diffracto Ltd., Windsor, Canada

[21] Appl. No.: 660,041

[22] Filed: Oct. 12, 1984

[51] Int. Cl.[4] .......................... G06F 15/46; H04N 7/18
[52] U.S. Cl. .................................... 364/513; 358/107; 358/104; 364/559; 364/571; 901/7; 901/8; 901/47
[58] Field of Search ............... 364/513, 478, 479, 571, 364/559, 191–193, 578; 901/9, 46, 47, 6–8; 250/203 R; 358/104, 105, 107, 125, 126, 903; 414/730

[56] References Cited

U.S. PATENT DOCUMENTS

| | | | |
|---|---|---|---|
| 4,044,377 | 8/1977 | Bowerman | 901/47 X |
| 4,146,924 | 3/1979 | Birk et al. | 364/559 X |
| 4,187,051 | 2/1980 | Kirsch et al. | 364/513 X |
| 4,219,847 | 8/1980 | Pinkney et al. | 358/126 |
| 4,396,945 | 8/1983 | DiMatteo et al. | 364/559 X |
| 4,453,085 | 6/1984 | Pryor | 250/561 X |
| 4,523,100 | 6/1985 | Payne | 901/47 X |

Primary Examiner—Joseph Ruggiero
Attorney, Agent, or Firm—Larson and Taylor

[57] ABSTRACT

A method and apparatus is disclosed for setting up fixed and robotic systems by using a robot programmed by design data for a part of structure to simulate a master of same. Envisioned primarily for use in auto body fabrication processes, the invention is generally useable with smaller parts and assemblies. It is considered vitally useful for programmable assembly of bodies or other larger objects where a variety of styles or other considerations virtually preclude effective master parts. The invention sequentially creates, point by point, a master in space, using programmable placement of master surfaces, target points, or cameras capable of evaluating location of assembly robots and other items, generally from target points thereon.

25 Claims, 3 Drawing Sheets

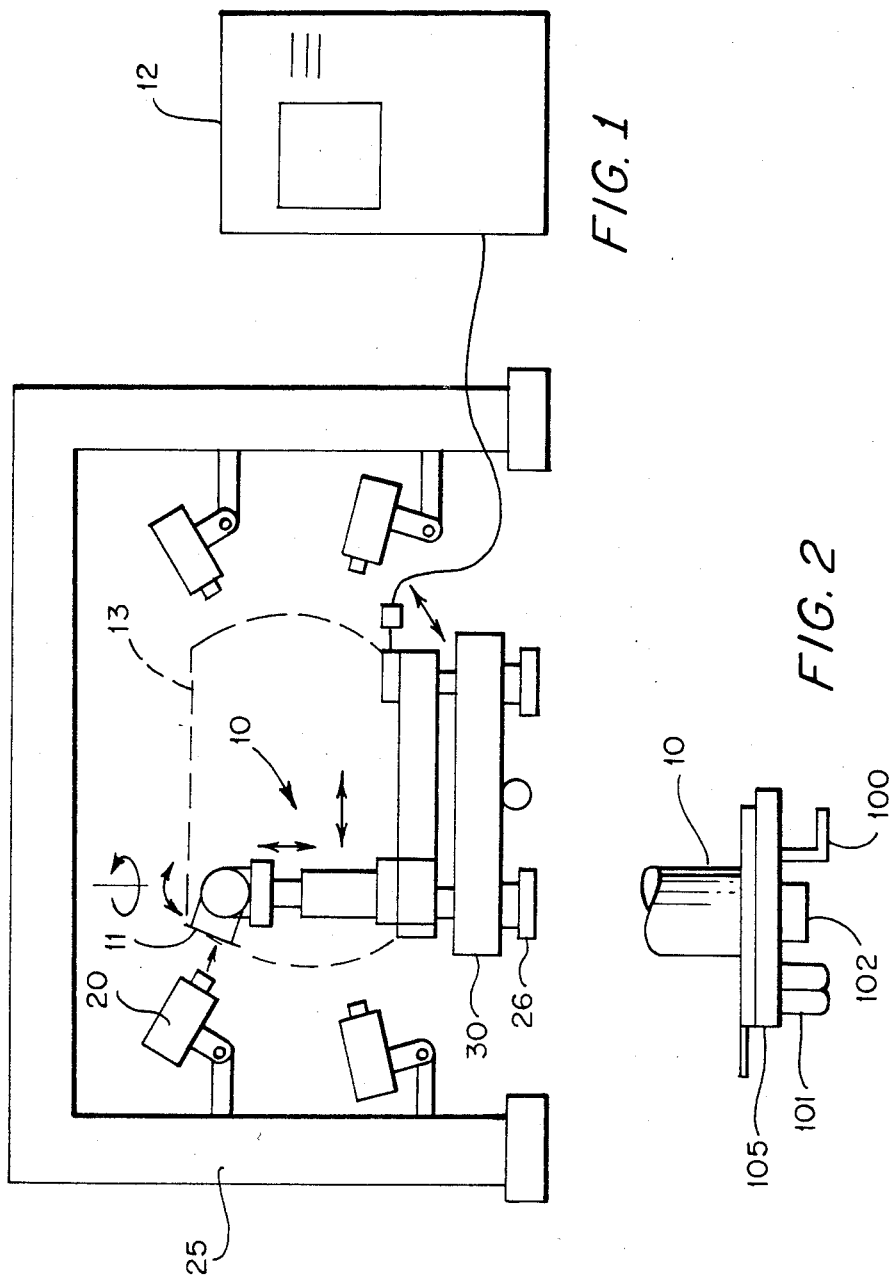

ROBOTIC ALIGNMENT AND PART SIMULATION

BACKGROUND

This invention is useful for setting up large fixtures, gages and robots as well as in construction of structures in general. It utilizes a highly accurate robot, programmed from the CAD data base of a body, for example, to set up a master surface block or target in position for the sensors to see.

A method and apparatus is disclosed for setting up fixed and robotic systems by using a robot programmed by design data for a part or structure to simulate a master of same. Envisioned primarily for use in auto body fabrication processes, the invention is generally useable with smaller parts and assemblies. It is considered vitally useful for programmable assembly of bodies or other larger objects where a variety of styles or other considerations virtually preclude effective master parts. The invention sequentially creates, point by point, a master in space, using programmable placement of master surfaces, target points, or cameras capable of evaluating location of assembly robots and other items, generally from target points thereon.

Incorporated by reference are the following:
1. Targets: Ser. No. 348,803, filed Feb. 16, 1982, abandoned.
2. Robot Calibration: Ser. No. 453,910, filed Dec. 28, 1982, abandoned in favor of FWC Ser. No. 750,049, filed June 27, 1985, abandoned in favor of FWC Ser. No. 894,721, filed Aug. 8, 1986.
3. Vision Assisted Fixture Construction: Ser. No. 660,279, filed Oct. 12, 1984, abandoned in favor of FWC Ser. No. 022,596, filed Mar. 4, 1987.
4. Pulsed Robotic Inspection: Ser. No. 462,127, filed Jan. 28, 1983, abandoned in favor of FWC Ser. No. 761,315, filed July 30, 1985, now U.S. Pat. No. 4,585,350.
5. Robot Vision Using Target Holes Corners and Other Object Features: Ser. No. 660,042, filed Oct. 12, 1984, abandoned in favor of FWC Ser. No. 933,256, filed Nov. 20, 1986.

CONVENTIONAL TECHNIQUES

Prior art solutions for mastering large structures such as car bodies or aircraft, have required construction of 'master' parts. Such masters are notoriously error prone, both in their manufacture and in their propensity to change with time, transport, etc. They are also very expensive (a typical car master cube or fixture can cost $1,000,000) and large and extremely heavy, making frequent use in plant difficult. How then does one say, realign or set up a single sensor on a robot of fixture relative to a part such as a body? Use of a master as described above is virtually precluded, and with current trends, master data actively lies in the CAD design program, not in a steel master anyway. This invention discloses several novel techniques, as well as other inventive concepts.

Figure 4:
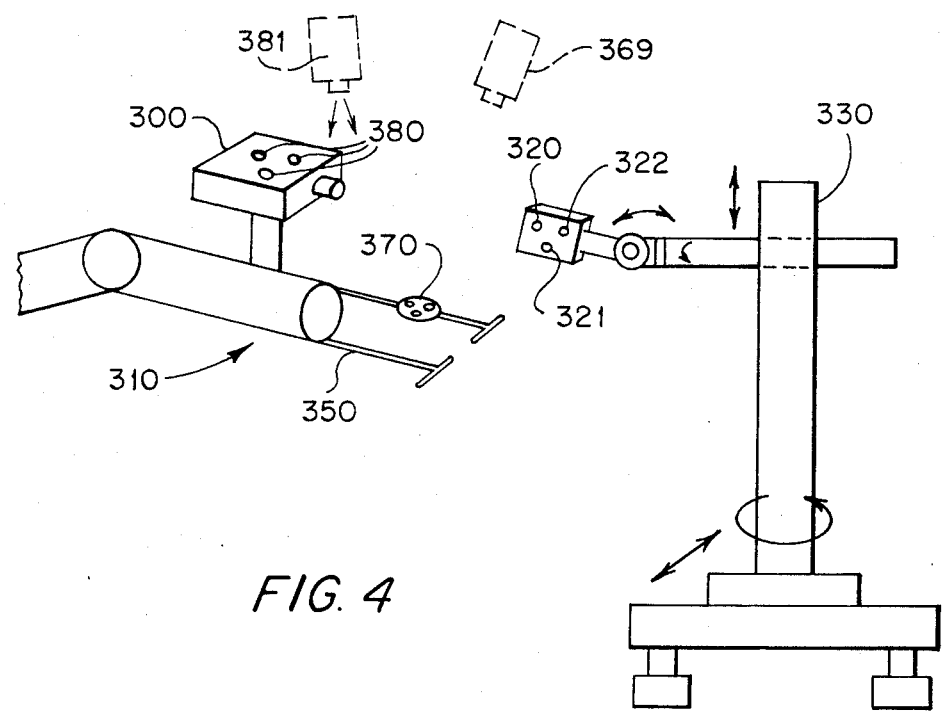
Figure 5A:
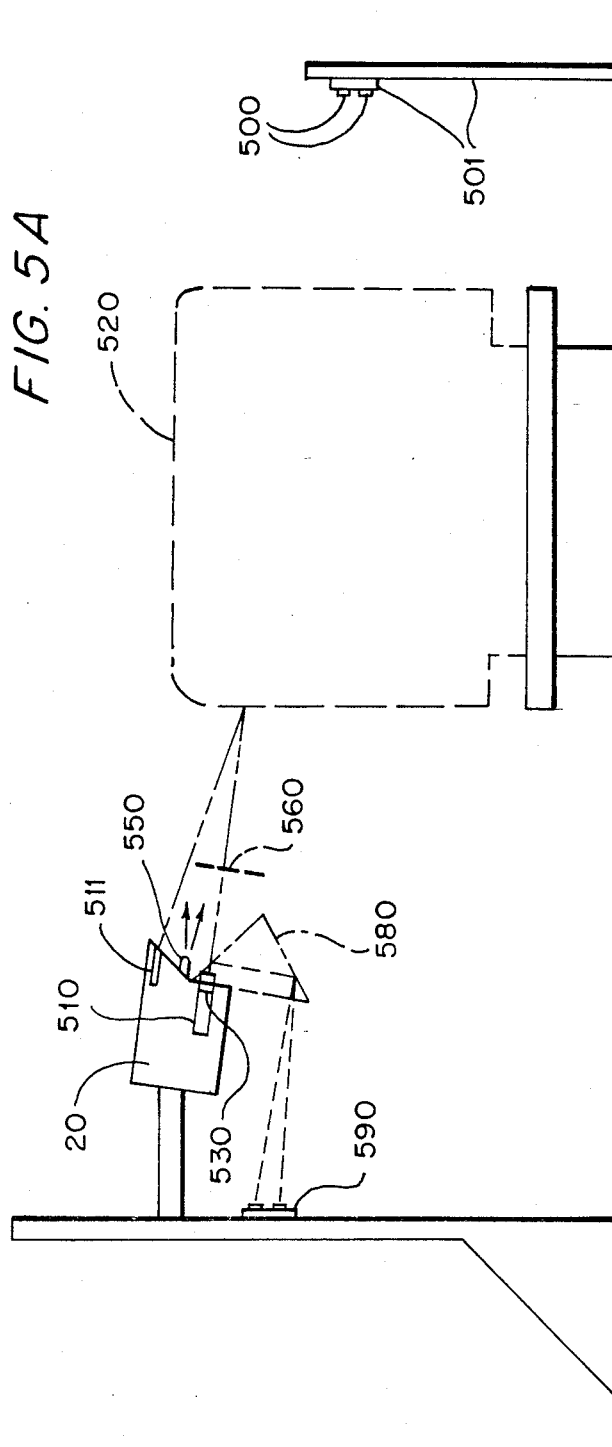
Figure 5B:
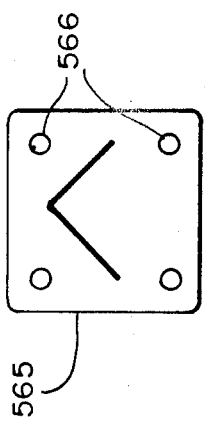

The invention is described in the following embodiments:
FIG. 1 illustrates a first embodiment of the invention
FIG. 2 illustrates a second embodiment of the invention
FIG. 3 illustrates a third embodiment of the invention
FIG. 4 illustrates a fourth embodiment of the invention
FIG. 5A illustrates a fifth embodiment of the invention
FIG. 5B illustrates an image of a matrix array.

FIG. 1 illustrates the invention where an accurate positioning multi degree of freedom robot such as 10 is used to accurately position surface 11 at a point in space under control of computer 12 which is programmed with CAD design data or other data of an object such as a car body 13 (dotted lines). The purpose of the robot 10 is to recreate, sequentially, the object itself in space such that machine vision based sensor units such as 20, attached to structure 25 can be lined up at key measurement locations.

This is an important embodiment since it is not possible in general to create an accurate master car body physically. In this case, however, a robot unit for example on one of the normal pallets 30 on which bodies are carried in a typical body plant 'Cartrac' conveyor 26, is brought in and programmed to move sequentially to the positions at which the body surfaces of a 'master car' or other desired situation would be. The sensor units in the structure then look at these positions in sequence and are then calibrated automatically relative to the math data base of the body used in the CAD system driving the robot. Clearly, movements can be programmed to exercise the sensors at the extremes of their range, within the body tolerance or any other routine.

This can be implemented interestingly in several ways. First it is desirable to use a robot that is quite accurate to make this sensor positioning. Preferable in many cases is a robot such as 10, capable of movng up from below, e.g. with a telescopic tube. Since the car body essentially exists on the top and two sides, it is highly desirable to have a robot coming up from below in essentially an inverted ganrty robot form. However, it is also possible to use a horizontal arm robot which can move side to side and then rotate around its base to position sensors on the other side essentially recreating the car body.

This highly accurate robot positioned could include several ways of correcting the sensors. The first way is to use, on the end of the robot end effector typically located on the end of a wrist on a horizontal arm, a NC machined block which would have effectively the same surface as that of the car at the location being checked. Typically such a block could be located on the end of the robot which would be interchangeable, either manually block by block, check by check, or via some sort of turret which would locate different blocks in sequence in position.

Alternatively, a single block might have NC machined into it numerous of the types of surfaces and the robot would simply position the correct portion of the block in the right example. This is shown in FIG. 2. Surfaces 100, 101, 102 characteristic of various body conditions, are indexable on slide 105 under computer control.

(Indeed, such a plate could mount any type of detail or tool not just a sensor, and thus the invention is of general use as described further on.)

The accurate robot is preferably of 6 or more axes capable of simulating location of all surfaces on a large 3D object (5 axes will suffice for some target sensing applications).

It should be noted as an aside that a robot of this type can be used for many more purposes than in setting up just inspection sensors. For example, anywhere in the line where it would be necessary to set up a CAD based equivalent of the car body, this unit can be used including setting up of all the welding robots and the like which could be off-line programmed rather than "taught". This invention is a great assist in verifying off-line programs.

As an alternative to the sensor projecting light at a surface carried by the robot, a sensor camera mounted on the robot can look at target points on the sensor or on a mounting plate or other member to which the sensor is attached.

A second application is thus to utilize, as shown in FIG. 3, target points 200, 201, 202 and 203 on the sensor boxes such as light section type 210. In this case, a target sensing camera unit 220 to pin point the target location, is located on the end of the robot 221. This camera can be ideally positioned accurately in a known manner, and is potentially more accurate than theodolite units or other techniques. Automatic target sensing techniques are noted in copending application Ser. No. 348,803, filed Feb. 16, 1982 and U.S. Pat. No. 4,219,847 (Pinckney et al).

Targets are typically retro reflective 'dots' of 3M Scotchlite 7615¼" in diameter or illuminated LEDs or fiber optic ends. Targets are typically in clusters of 3 or 4.

There is also a third possibility where the camera of the sensor (e.g. 211) is on a check fixture (as in FIG. 1) or on camera units located on robots, such as 300 in FIG. 4, for the purpose of guiding robot welders such as 310. For example, one can use target points such as 320, 321, 322 located on the end of the accurate calibrated robot 330 (in this case a horizontal arm type capable of rotating round its base) to calibrate sensors. Where sensors are susceptible to variations in the surface and the like and need to be more closely calibrated to certain surfaces as in sometimes the check fixture sensors, the same idea as FIG. 1 can be utilized using master blocks on the end of the high accuracy robot (in this case containing test panels which could be welded by spot welder tip 350). Similarly, adhesive robot spray trim assembly robots, machining robots and all other types can be checked out in this manner.

It is noted that with a single target point and a single matrix array camera (such as GE TN2500), an xy location can be determined (with linear arrays such as Reticon 1024G only a single axis of data is available). If 3, or better 4, targets are used with said matrix camera, a full 6 degree of freedom solution is available (x,y,z, roll, pitch, yaw). this can be obtained with a single camera, or to even better accuracies, with two cameras (which is needed where the polar/rotational theodolite layout issued for the accurate robot).

Thus, location of sensor to target and alignment can be determined by moving the target (or sensor) to different known points and reading the effect.

The same holds true for a body test surface which is moved by the robot in front of a ranging or gray level image detecting sensor.

Again, noted is the very important feature that the accurate robot preferably is driven from the CAD system descriptive of the part to which it is setting up. It doesn't have to be car bodies, it could be any generalized part to which the robot is capable of describing the positions of or even a portion of its positions. In other words, it's possible to entertain more than one robot to set up the positions for any given structure.

Car bodies are the principal application envisioned at this point in time, and potentially aircraft as well. The key requirement for this device and that shown above is in the area of continued verification of sensor or tooling positions and particularly those that are programmably placed and therefore subject to drift or other difficulties. It is also particularly those programmable ones that can be off-line programmed where means is required to check the program validity relative to an actual part which may exist only in a data base.

The accurate robot need not be on a pallet but can be brought to the check out location by any means (crane, AGV, truck, etc.) When pallet mounted with say 60 other auto body pallets in a loop, it could circulate once per loop revolution checking each station in turn, or only those stations in trouble (e.g. the robotic weld station of FIG. 4). Alternatively it could be cycled after hours. Accurate machine location is typically under full automatic control, but manually can be positioned too.

Another embodiment is to employ an overhead sensor such as 369 (dotted lines) for targets on a welder end tooling and sense the location of the targets using a camera overhead or elsewhere located to dynamically correct the welder location during the welding process, and/or to record the metal surface position by recording the point at which the surface contacts the welder tip (e.g. completing a circuit) while monitoring the targets location at this instant. In this manner one can determine car surface location in line without resort to special in-line check fixtures as in FIG. 1.

Similarly, camera 300 of vision controlled robot welder can be used to view the location of other features of the car surface and its location can be accurately determined by camera 381 by looking at targets 380. Accuracies can be to 0.001", easily in excess of the 0.50" of typical hydraulic robots used in automotive welding.

Thus, by judicious use of camera technology, robot or other working stations can be used to inspect the part before, during or after working to determine desired corrective action required, if any (such as off sorting robot programs, adjusting previous operations, producing out of tolerance parts, entering the station).

It is noted that for target sighting, the multi degree of freedom accurate robot can be a angular coordinate theodolite type system capable of pointing a checkout camera at the sensor (as in FIG. 3), or presenting targets to a sensor camera (as in FIG. 4). This single or dual theodolite arrangement is much simpler mechanically and can be more easily brought to the station or carried down line on the pallet. However, it obviously can't position a surface in the correct car position. It further requires a larger depth of field of the camera unit (which isn't too severe). See FIG. 5A whose approach can be used if necessary.

In FIG. 5A, another aspect of the invention is noted. Targets 500 on plate 501 for example can be placed across the line from the light section camera sensor 20 comprises of solid state TV camera 510 and 10 MW laser diode line projection source 511. Once the sensor 20 is aligned with respect to car body 520, targets 500 can be placed to allow camera pointing direction to be determined at any time, such as on sensor replacement. It can also be used for automatically offsetting measured part data in the computer, if the angle of sensor view is determined to be shifted on consideration of the targets.

Every time the car body is transfered, the view is open for sensor 20 to view the targets and thus a correction 'shot' can be taken each cycle to assure the sensor is in the correct position. To accomplish this effectively the typical sensor (imagng or light section) has to have a large depth of field or an ability to adjust field depth such as with adjustable iris diaphragm 530. This is useful as laser power 511 is limited and the light section triangulation sensor which typically has to run with a wide open lens due to light power considerations on reflectance from body 520. With retro reflective targets such as 500, a small light 550 (which could also be a laser) is sufficient to obtain good data with the lens stopped down.

Targets can also be located on a transparent screen 560 in the field of view but out of the area of interest (FIG. 5B inset shows images 566 of targets on camer matrix array 565). Also possible is to use a beam splitter, prism combination 580 (dotted lines) (or indexible mirror) to direct an image of targets 590 to the sensor camera.

While generally used for non-contact sensor units of the triangulation type, the procedures herein are useful for other sensors or devices such as capacitive sensors, etc.

Note that where the accurate robot is indexed into a station (such as on the Cartrac pallet of FIG. 1), it is necessary to locate the pallet accurately relative to the structure holding the object of interest such as the sensors shown. This can be done using physical locators such as shot pins, clamps etc., or can be done by using the robot to point a TV camera or other means at a plurality of reference points (targets) on said structure from which the relative location of structure to robot can be determined.

In general however, unless parts to be made can also be target located from said structure, it is best to locate the accurate robot in the same manner as the part (e.g. a car on a pallet).

What is claimed is:

1. A method for accurately positioning an object movably mounted on a base relative to a predetermined point in space adjacent the base, comprising the steps of:
   providing a surface on an end of a multiple degree of freedom robot, which robot end is highly accurately positionable;
   locating the robot adjacent the base at a position known relative to the base;
   actuating the robot to move the end so that the surface is moved to the predetermined point in space;
   determining the position of the object relative to the surface; and
   moving the object as needed to bring the object into the desired accurate position relative to the surface.

2. A method for positioning an object as claimed in claim 1 wherein the object is a TV camera having a line of sight and wherein the moving step includes the step of aligning the line of sight of the TV camera directly toward the surface.

3. A method for positioning an object as claimed in claim 1 wherein the object is a TV camera and wherein the moving step includes the step of changing the location of the object relative to the base.

4. A method for positioning an object as claimed in claim 1 wherein the object is a TV camera; wherein the providing step includes the locating of targets on the surface; and wherein the determining step includes the step of imaging the targets with the TV camera.

5. A method for positioning an object as claimed in claim 1 wherein the robot is programmable to move the surface to a desired position, and wherein the actuating step includes the programming of the robot to move the surface to the predetermined point.

6. A method for positioning an object as claimed in claim 1 wherein the providing step includes the step of contouring the surface to resemble a surface of a test part at the location of the point in space.

7. A method for positioning an object as claimed in claim 6 wherein the robot is provided with a plurality of differently contoured surfaces which are indexable to the end of the robot, and wherein the providing step further includes the indexing of a desired one of the differently contoured surfaces to the end.

8. A method for positioning an object as claimed in claim 1 wherein there are a plurality of objects on the base to be positioned relative to a plurality of predetermined points in space, which points in space represent different locations on a test part; and further including the step of repeating the steps of actuation, determining and moving for each of the objects to be positioned.

9. A method for positioning an object as claimed in claim 1 wherein the robot is located on a conveyance mechanism and the base is located at a station along the conveyance mechanism; and wherein the locating step includes the conveying of the robot along the conveyance mechanism to the station.

10. A method for positioning an object as claimed in claim 9 wherein other bases and associated objects are provided at different stations; and further including the steps of sequentially moving the robot to different stations and then repeating the actuating, determining and moving steps as needed for each object.

11. A method for positioning an object as claimed in claim 1 wherein the object is movably mounted to the base by use of a positionable arm of a second robot to which arm the object is attached, and wherein the moving step includes the step of actuating the second robot to move the object.

12. A method for accurately determining the position of an object mounted to a base relative to a predetermined point in space adjacent the base, comprising the steps of:
    providing a surface on an end of a multiple degree of freedom robot, which robot end is highly accurately positionable;
    locating the robot adjacent the base at a position known relative to the base;
    actuating the robot to move the end so that the surface is moved to the predetermined point in space;
    determining the position of the object relative to the surface; and
    calibrating the position of the object based upon the determined position of the object relative to the surface.

13. A method for determining the position of an object as claimed in claim 12 wherein the object is a TV camera; wherein the providing step includes the locating of targets on the surface; and wherein the determining step includes the step of imaging the targets with the TV camera.

14. A method for determining the position of an object as claimed in claim 12 wherein the robot is programmable to move the surface to a desired position, and wherein the actuating step includes the programming of the robot to move the surface to the predetermined point.

15. A method for determining the position of an object as claimed in claim 12 wherein the providing step includes the step of contouring the surface to resemble a surface portion of a part which is to be brought to the location of the point in space.

16. A method for determining the position of an object as claimed in claim 15 wherein the robot is provided with a plurality of differently contoured surfaces which are indexable to the end of the robot, and wherein the providing step further includes the indexing of a desired one of the differently contoured surfaces to the end.

17. A method for determining the position of an object as claimed in claim 12 wherein there are a plurality of objects on the base to be calibrated relative to a plurality of predetermined points in space, which points in space represent different locations on a part; and further including the step of repeating the steps of actuation, determining, and calibrating for each of the objects to be calibrated.

18. A method for determining the position of an object as claimed in claim 12 wherein the robot is located on a conveyance mechanism and the base is located at a station along the conveyance mechanism; and wherein the locatng step includes the conveying of the robot along the conveyance mechanism to the station.

19. A method for determining the position of an object as claimed in claim 18 wherein other bases and associated objects are provided at different stations; and further including the steps of sequentially calibrating the robot to different stations and then repeatng the actuating, determining and calibrating steps as needed for each object.

20. A method for creating a test surface for use in operatively associating a plurality of work elements such as sensors, manipulators and working tools provided at a work station with an article to be worked on at the station, comprising the steps of:
providing a surface on an end of a multiple degree of freedom robot, which robot end is highly accurately positionable;
locating the robot adjacent to the work station;
actuating the robot to move the end so that the surface is moved to a predetermined point in space which corresponds to the position to be occupied by a particular surface portion of the article;
determining the position of the surface relative to the work element operatively associated with the surface portion of the article;
operatively assocating the work element with the surface such that the work element is consequently accurately operatively associated with the surface portion of the article to be worked on; and
repeatign the actuating step, determining step, and associating step at the work station for each work element and corressponding surface portion of the article whereby a test surface of relevant points is sequentially created.

21. A method for creating a test surface as claimed in claim 20 wherein the robot is programmable to move the surface to the desired positions, wherein a CAD database contains the relevant positions of the surface portions of the article, and wherein the actuating step includes the programming of the robot to move the surface to the desired positions using the information contained in the CAD database.

22. A method for creating a test surface as claimed in claim 20 wherein the robot is provided with a plurality of differently contoured surfaces which are indexable to the end of the robot, and wherein the providing step further includes the indexing of a desired one of the differently contoured surfaces to the end.

23. A method for creating a test surface as claimed in claim 20 wherein the robot is located on a conveyance mechanism and wherein the locating step includes the conveying of the robot along the conveying mechanism to the station.

24. A method for accurately determining the position of an object mounted to a base relative to a predetermined point in space adjacent the base, comprising the steps of:
providing targets on the object;
providing a target sensor on an end of a multiple degree of freedom robot, which robot end is highly accurately positionable;
locating the robot adjacent the base at a position known relative to the base;
actuating the robot to move the end so that the sensor is moved to the predetermined point in space;
imaging the targets with the sensor; and
determining the position of the targets with the sensed image and hence the position of the object relative to the sensor.

25. A method for determining the position of an object as claimed in claim 24 wherein the robot is programmable to move the sensor to a desired position, and wherein the actuating step includes the programming of the robot to move the sensor to the predetermined point.

* * * * *